United States Patent
Tsukuma et al.

(10) Patent No.: US 7,217,406 B2
(45) Date of Patent: May 15, 2007

(54) LITHIUM-MANGANESE COMPOSITE OXIDE GRANULAR SECONDARY PARTICLE, METHOD FOR PRODUCTION THEREOF AND USE THEREOF

(75) Inventors: Koji Tsukuma, Tsukuba (JP); Minoru Kuniyoshi, Yamaguchi (JP)

(73) Assignee: Tosoh Corporation, Yamaguchi (JP)

( * ) Notice: Subject to any disclaimer, the term of this patent is extended or adjusted under 35 U.S.C. 154(b) by 257 days.

(21) Appl. No.: 10/505,141

(22) PCT Filed: Feb. 20, 2003

(86) PCT No.: PCT/JP03/01877

§ 371 (c)(1),
(2), (4) Date: Aug. 20, 2004

(87) PCT Pub. No.: WO03/070642

PCT Pub. Date: Aug. 28, 2003

(65) Prior Publication Data

US 2005/0123832 A1    Jun. 9, 2005

(30) Foreign Application Priority Data

Feb. 21, 2002  (JP)  ............... 2002-044877
Jul. 4, 2002   (JP)  ............... 2002-195797

(51) Int. Cl.
  *C01D 15/00*  (2006.01)
  *C01G 1/00*   (2006.01)
  *C01G 45/00*  (2006.01)
  *H01M 4/00*   (2006.01)
  *H01M 4/48*   (2006.01)

(52) U.S. Cl. ............... 423/593.1; 423/599; 423/594.15; 423/594.6; 423/594.4; 423/596; 423/594.2; 423/594.16; 423/49; 423/179.5; 423/111; 423/138; 423/53; 423/155; 429/231.1; 429/224; 429/231.3; 429/223; 429/221; 429/231.6; 429/231.5; 429/231.95

(58) Field of Classification Search ............... 423/599, 423/594.15, 593.1, 594.6, 594.4, 596, 594.2, 423/594.16, 49, 179.5, 111, 138, 53, 155; 429/231.1, 224, 231.3, 223, 221, 231.6, 231.5, 429/231.95

See application file for complete search history.

(56) References Cited

U.S. PATENT DOCUMENTS 6,670,076 B1 *  12/2003  Iwata et al. ............. 429/231.95
6,706,444 B1 *  3/2004   Numata et al. .............. 429/224
6,875,416 B1 *  4/2005   Benz ..................... 423/594.15
6,998,069 B1 *  2/2006   Coluccia et al. .......... 252/518.1
7,008,608 B2 *  3/2006   Park et al. ................ 423/594.6

FOREIGN PATENT DOCUMENTS

| JP | 2000-323123 A | 11/2000 |
| JP | 2001-143687 A | 5/2001 |
| JP | 2002-053321 A | 2/2002 |
| JP | 2002-53321 A * | 2/2002 |
| WO | WO 01/004975 A1 | 1/2001 |

OTHER PUBLICATIONS

English translation of Japan Patent Document No. 2002-53,321 A published Feb. 19, 2002.*

* cited by examiner

Primary Examiner—Timothy C. Vanoy
(74) Attorney, Agent, or Firm—Sughrue Mion, PLLC (57) ABSTRACT

Granular secondary particles of a lithium-manganese composite oxide suitable for use in non-aqueous electrolyte secondary batteries showing high-output characteristics which are granular secondary particles made up of aggregated crystalline primary particles of a lithium-manganese composite oxide and have many micrometer-size open voids therein with a defined average diameter and total volume of open voids. A process for producing the granular secondary particles which includes spray-drying a slurry of at least a manganese oxide, a lithium source, and an agent for open-void formation to thereby granulate the slurry and then calcining the granules.

11 Claims, 3 Drawing Sheets

LITHIUM-MANGANESE COMPOSITE OXIDE GRANULAR SECONDARY PARTICLE, METHOD FOR PRODUCTION THEREOF AND USE THEREOF

TECHNICAL FIELD

The present invention relates to a lithium-manganese composite oxide powder, a process for producing the same, and a non-aqueous electrolyte secondary battery as a use of the powder.

BACKGROUND ART

For use as a positive active material for non-aqueous electrolyte secondary batteries, a lithium-manganese composite oxide is used in the form of a powder composed of granular secondary particles of an appropriate size formed by the sintering of crystalline primary particles. Several processes have hitherto been used as processes for producing granular secondary particles. For example, JP-A-2000-169151 discloses a process comprising obtaining a lithium-manganese composite oxide by the reaction of electrolytic manganese dioxide with lithium carbonate, wherein the size of the electrolytic manganese dioxide as a starting material is regulated by pulverization to thereby enable the granular secondary particles to retain this size even after the reaction. JP-A-10-172567 discloses a process in which a slurry prepared by dispersing a powder of electrolytic manganese dioxide in an aqueous solution of a water-soluble lithium compound is spray-dried and granulated to obtain granular secondary particles. Furthermore, JP-A-10-228515 and JP-A-10-297924 disclose a process in which a fine powder is compacted/aggregated with a roller compactor or the like to obtain granular secondary particles.

As can be seen from those documents, priority has hitherto been given to densifying granular secondary particles as much as possible to heighten powder packing density from the standpoint of heightening the discharge capacity of batteries per unit volume. Consequently, there have been a limited number of documents which disclose granular secondary particles characterized by the structure thereof, in particular, by the voids present therein.

Among the documents which disclose granular secondary particles characterized by the voids present therein is, for example, JP-A-2002-75365. This technique is intended to provide a positive active material excellent in high-rate charge/discharge characteristics and cycle characteristics by forming voids within the particles of a positive active material. However, these voids are closed voids and not connected to the environment surrounding the particles. Because of this, the diffusion of lithium ions into the liquid electrolyte is insufficient and the improvements in high-rate characteristics and cycle characteristics have been insufficient. Specifically, although high-rate charge/discharge characteristics are evaluated in that patent document in terms of ratio between the capacity in current flowing at 2.0C. and the capacity in current flowing at 0.2C. in the page 5, Table 2 therein, the values of this capacity ratio are 90% or lower, indicating that the high-rate charge/discharge characteristics are insufficient.

DISCLOSURE OF THE INVENTION

The invention has been achieved after directing attention to the structural regulation of granular secondary particles of a lithium-manganese composite oxide, in particular, the state of open voids in the granular secondary particles.

An object of the invention is to provide a lithium-manganese composite oxide positive active material suitable for use as a constituent material for a non-aqueous electrolyte secondary battery having high output characteristics and a process for producing the active material.

Another object of the invention is to provide a non-aqueous electrolyte secondary battery employing the lithium-manganese composite oxide positive active material having excellent properties.

The invention provides the lithium-manganese composite oxide, process for producing the same, and non-aqueous electrolyte secondary battery described below. The objects of the invention are accomplished with these.

(1) Granular secondary particles of a lithium-manganese composite oxide which are granular secondary particles made up of aggregated crystalline primary particles of a lithium-manganese composite oxide, characterized in that
the granular secondary particles have many micrometer-size open voids therein, the open voids having an average diameter in the range of from 0.5 to 3 µm and the total volume of the open voids being in the range of from 3 to 20 vol. % on average based on the total volume of the granular secondary particles.

(2) The granular secondary particles of a lithium-manganese composite oxide as described in (1) above, characterized in that the granular secondary particles have a specific surface area of from 0.2 to 1.0 m$^2$/g and an average diameter of from 5 to 30 µm, and the crystalline primary particles constituting the granular secondary particles have an average diameter of from 0.5 to 4.0 µm.

(3) The granular secondary particles of a lithium-manganese composite oxide as described in (1) above, characterized by being represented by the compositional formula $Li_xM_yMn_{3-X-Y}O_{4-Z}F_z$ (wherein X, Y, and Z are such numbers that X=1.0 to 1.2, Y=0 to 0.3, and Z=0 to 0.3; and M represents one or more elements selected from Al, Co, Ni, Cr, Fe, and Mg).

(4) The granular secondary particles of a lithium-manganese composite oxide as described in (1) above, characterized in that the content of one or more boric acid compounds contained as an impurity in the granular secondary particles of a lithium-manganese composite oxide is lower than 0.0005 in terms of molar ratio between the manganese and boron (B/Mn) contained in the lithium-manganese composite oxide.

(5) The granular secondary particles of a lithium-manganese composite oxide as described in (4) above, characterized in that the boric acid compounds contained as an impurity are lithium borate and/or lithium sodium borate.

(6) A process for producing the granular secondary particles of a lithium-manganese composite oxide as described in (1) above, characterized by comprising spray-drying a slurry prepared by dispersing a fine powder of a manganese oxide and a fine powder of lithium carbonate or by dispersing a fine powder of a manganese oxide, a fine powder of lithium carbonate, and a compound containing one or more elements selected from Al, Co, Ni, Cr, Fe, and Mg to thereby granulate the slurry and then calcining the granules at a temperature of from 700 to 900° C.

(7) The process for producing granular secondary particles of a lithium-manganese composite oxide as described in (6) above, characterized in that the fine powder of a manganese oxide and the fine powder of lithium carbonate have an average particle diameter of 1 µm or smaller.

(8) A process for producing the granular secondary particles of a lithium-manganese composite oxide as described in (1) above, characterized by comprising spray-drying a slurry prepared by dispersing a fine powder of a manganese oxide, a lithium source, and an agent for open-void formation or by dispersing a fine powder of a manganese oxide, a fine powder of lithium carbonate, a compound containing one or more elements selected from Al, Co, Ni, Cr, Fe, and Mg and an agent for open-void formation to thereby granulate the slurry and then calcining the granules at a temperature of from 700 to 900° C.

(9) The process for producing granular secondary particles of a lithium-manganese composite oxide as described in (8) above, characterized in that the agent for open-void formation is a substance which has an average particle diameter of 1 μm or smaller and disappears upon heating.

(10) The process for producing granular secondary particles of a lithium-manganese composite oxide as described in (6) above, characterized in that a compound which is a compound of an element other than manganese, lithium, fluorine, v and aluminum, cobalt, nickel, chromium, iron, and magnesium is not an agent for open-void formation is added as an additive to the slurry.

(11) The process for producing granular secondary particles of a lithium-manganese composite oxide as described in (10) above, characterized in that the additive is a boron compound, and that the compound is added to the slurry in an amount in the range of from 0.0005 to 0.05 in terms of molar ratio between manganese and boron (B/Mn) and, after the calcining, the boron is removed by water washing to such a degree that the molar ratio (B/Mn) decreases to below 0.0005.

(12) A non-aqueous electrolyte secondary battery characterized by employing the granular secondary particles of a lithium-manganese composite oxide as described in (1) above as a positive active material.

BEST MODE FOR CARRYING OUT THE INVENTION

The invention has been achieved based on the finding that the size and amount of open voids present in granular secondary particles of a lithium-manganese composite oxide are factors which govern the discharge rate characteristics (the property corresponding to the high-rate charge/discharge characteristics in JP-A-2002-75365) of non-aqueous electrolyte secondary batteries employing this oxide as a positive active material. Namely, the granular secondary particles of a lithium-manganese composite oxide of the invention are characterized in that many micrometer-size open voids are present in network arrangement in the particles, and that the size of these voids is in the range of from 0.5 to 3 μm in terms of average diameter and the amount thereof is in the range of from 3 to 20 vol. % on average based on the volume of the granules.

The most characteristic feature resides in that many micrometer-size open voids are present in network arrangement in the granular secondary particles (hereinafter often referred to simply as "granules"). As a result, the discharge rate characteristics of batteries can be improved.

The micrometer-size open voids are specified by size and amount. The size thereof is from 0.5 to 3 μm in terms of average diameter, and the amount thereof is from 3 to 20 vol. % on average based on the granule volume. In case where the average particle diameter of the open voids is smaller than 0.5 μm, the battery has reduced discharge rate characteristics. In case where the open voids have a size exceeding 3 μm, the strength of the granules is difficult to maintain. The most preferred range of the average diameter is from 1.0 to 2.5 μm.

In case where the proportion of the open voids is lower than 3 vol. %, the battery has reduced discharge rate characteristics. In case where the proportion thereof exceeds 20 vol. %, it is difficult to secure a high powder packing density required of electrode materials. The most preferred range of the proportion of the open voids is from 5 to 15 vol. %.

Incidentally, the average diameter and amount of the open voids are values determined through the approximation of the open voids to spheres. The values thereof can be determined by a method which comprises taking a scanning electron photomicrograph of a section of granules and subjecting the photograph to image analysis; these values are number-average values obtained by averaging the found values for at least 500 voids.

Besides having many open voids, the granular secondary particles of the invention are preferably further characterized in that the granules have a specific surface area of from 0.2 to 1.0 m²/g and an average diameter of from 5 to 30 μm and that the crystalline primary particles constituting the granules have an average diameter of from 0.5 to 4.0 μm. These values are preferred in order for the granules to bring about the maximum secondary-battery performances when used as a positive active material. For example, specific surface areas thereof exceeding 1.0 m²/g or diameters of the crystalline primary particles smaller than 0.5 μm are undesirable because use of such granules results in considerable deterioration of charge/discharge capacity with cycling at a temperature of 50° C. or higher. Specific surface areas thereof smaller than 0.2 m²m/g or diameters of the crystalline primary particles exceeding 4.0 μm are undesirable because use of such granules result in a decrease in discharge rate characteristics. Average diameters of the granular secondary particles outside the range of from 5 to 30 μm are undesirable from the standpoint of constituting a sheet electrode.

The lithium-manganese composite oxide of the invention is preferably represented by the compositional formula $Li_XM_YMn_{3-X-Y}O_{4-Z}F_Z$ (wherein X, Y, and Z are such numbers that X=1.0 to 1.2, Y=0 to 0.3, and Z=0 to 0.3; and M represents one or more elements selected from Al, Co, Ni, Cr, Fe, and Mg). The values of X, which indicates lithium content, and Y, which indicates the content of the element M, are important in determining charge/discharge capacity and stability to charge/discharge cycling. Especially preferred ranges of X and Y are such that X=1.05 to 1.15, Y=0.05 to 0.25, and X+Y=1.15 to 1.30.

When boric acid compounds are present on the surface of the granules and within the open voids in a certain amount or larger, adverse influences are exerted on battery performances. The preferred range of boric acid compound amount in which the compounds exert no influence on battery performances is such that the molar ratio of boron to manganese (B/Mn) is lower than 0.0005. This ratio is more preferably lower than 0.0003.

The process of the invention for producing the granular secondary particles is characterized by comprising spray-drying a slurry prepared by dispersing a fine powder of a manganese oxide and a fine powder of lithium carbonate to thereby granulate the slurry and then calcining the granules at a temperature of from 700 to 900° C., or by comprising spray-drying a slurry prepared by dispersing a fine powder of a manganese oxide, a lithium source, and an agent for open-void formation to thereby granulate the slurry and then calcining the granules at a temperature of from 700 to 900° C.

Examples of the manganese oxide powder include electrolytic manganese dioxide, chemically synthesized manganese dioxide, $Mn_3O_4$, $Mn_2O_3$, and the like.

Examples of the lithium source include lithium hydroxide and lithium nitrate, which are water-soluble, and lithium carbonate, which is insoluble in water. In the case where lithium carbonate, which is insoluble in water, is used as a lithium source, the particle sizes of the lithium carbonate and the manganese oxide are an important factor which governs the size of voids because this lithium carbonate serves also as an agent for open-void formation. The particle size thereof is desirably on the submicrometer order, and is preferably 1 μm or smaller, more preferably in the range of from 0.3 to 0.7 μm, in terms of the average particle diameter of the powdery mixture of the lithium carbonate and the manganese oxide. Such a particle size is easily attained by adding a powder of a manganese oxide and a powder of lithium carbonate to water and mixing the ingredients with pulverization. As apparatus for the pulverization/mixing can be used a ball mill, oscillating mill, mill of the wet medium stirring type, and the like.

Incidentally, in the case where open voids having a larger total volume are desired, an agent for open-void formation other than lithium carbonate may be added.

A water-soluble lithium source such as lithium hydroxide or lithium nitrate can be used as a lithium source besides lithium carbonate.

In this case, it is necessary to use an agent for open-void formation and the particle size of this agent for open-void formation is an important factor which governs the size of voids. The particle size thereof is desirably on the submicrometer order. Specifically, it is preferably 1 μm or smaller, more preferably in the range of from 0.3 to 0.7 μm. Such a particle size of the agent for open-void formation is easily attained by adding a powder of a manganese oxide, a lithium source, and a powder of the agent for open-void formation to water and subjecting these ingredients to wet pulverization/mixing. As apparatus for the pulverization/mixing can be used a ball mill, oscillating mill, mill of the wet medium stirring type, and the like.

As the agent for open-void formation is used a substance which disappears upon heating, such as, e.g., carbon black, carbon nanotubes, or graphite.

The amount of voids can be regulated by changing the amount of the agent for open-void formation and the amount of lithium carbonate. The amount of voids is preferably from 3 to 20 vol. %, most preferably from 5 to 15 vol. %, on average based on the volume of the granules.

The slurry which has undergone the wet pulverization/mixing is granulated by spray drying. The spray drying can be conducted with an ordinary spray dryer in which a slurry is sprayed with a rotating disk or fluid nozzle and drying the droplets with hot air. Granulation techniques other than spray drying can be used, such as, e.g., the in-liquid granulation method and rolling granulation method. However, spray drying is most advantageous industrially.

A compound of an element other than manganese and lithium, e.g., a compound of aluminum, chromium, or the like, is often added for the purpose of heightening the performance of the lithium-manganese composite oxide of the invention as a positive active material. In the case where a compound of the element M is added, it is preferred to add it in the form of an oxide of the element or a precursor (hydroxide, etc.) for the oxide. With respect to methods for the addition thereof, it is desirable to add it to the slurry comprising a manganese oxide and lithium carbonate before the wet pulverization/mixing.

The addition of a boron compound as described in (11) above is conducted for the purpose of regulating the shape of the crystalline primary particles of the lithium-manganese composite oxide. This attains the formation of open voids in even network arrangement. As the boron compound can be used $H_3BO_3$, $B_2O_3$, $Li_2O.nB_2O_3$ (n=1 to 5), or the like. The compound is added before calcining, and is desirably added to the slurry before spray drying. The amount of the compound to be added is preferably in the range of from 0.0005 to 0.05, more preferably in the range of from 0.01 to 0.001, in terms of molar ratio to manganese (B/Mn). After calcining, the boron compound remains as a boric acid compound on the surface of the composite oxide granules and in the open voids. Since the remaining boron compound exerts adverse influences on battery performances, it is preferred to remove it by water washing to such a degree that the molar ratio of boron to manganese (B/Mn) decreases to below 0.0005.

The preferred range of boric acid compound amount in which the compound exerts no influence on battery performances is such that the molar ratio of boron to manganese (B/Mn) is lower than 0.0005. This ratio is more preferably lower than 0.0003.

The non-aqueous electrolyte secondary battery employing the lithium-manganese composite oxide of the invention as a positive active material shows excellent discharge rate characteristics. The excellent discharge rate characteristics are presumed to have been brought about by the many open voids present in even network arrangement in the granular secondary particles of a lithium-manganese composite oxide of the invention. Namely, the following is presumed. Discharge rate improves as lithium ion transport within the positive active material becomes easier. As a result of the formation of the network structure of the positive active material due to the many open voids, the distance over which lithium ions are transported between the positive active material and the liquid electrolyte surrounding the same has decreased and, hence, the transport has become easy.

EXAMPLES

The invention will be explained below in detail by reference to Examples, but the invention should not be construed as being limited to the following Examples.

Example 1

A lithium carbonate powder (average particle diameter, 7 μm), a powder of electrolytic manganese dioxide (average particle diameter, 3 μm), and boric acid were used in such weighed amounts as to result in the composition $Li_{1.1}Mn_{1.9}B_{0.01}O_4$. Water was added thereto in an appropriate amount. Thereafter, the particulate ingredients were pulverized with a mill of the wet medium stirring type for 1 hour. Water was added thereto in such an amount as to give a slurry having a solid concentration of 15 wt %. The water was vaporized with a spray dryer to obtain spherical granular dry particles. The spray drying was conducted at a hot-air inlet temperature of 250° C. This dry powder was calcined at 850° C. for 5 hours to obtain a lithium-manganese composite oxide. Furthermore, this oxide was washed in 95° C. hot water bath for 1 hour, recovered by filtration, and then dried to obtain a sample.

Examples 2 to 4

Samples were obtained in completely the same manner as in Example 1, except that each of aluminum hydroxide, chromium oxide, and nickel hydroxide powders was used as an additive (M) besides the lithium carbonate, electrolytic manganese dioxide, and boric acid powders in Example 1 and these ingredients were mixed in such weighed amounts as to result in the composition $Li_{1.1}M_{0.1}Mn_{1.8}B_{0.01}O_4$ (M=Al, Cr, or Ni).

Example 5

A sample was obtained in completely the same manner as in Example 1, except that a lithium fluoride powder and an aluminum hydroxide powder were used as additives besides the lithium carbonate, electrolytic manganese dioxide, and boric acid powders in Example 1 and these ingredients were mixed in such weighed amounts as to result in the composition $Li_{1.03}Al_{0.16}Mn_{1.81}B_{0.005}O_{3.8}F_{0.2}$.

Example 6

A sample was obtained in completely the same manner as in Example 1, except that an aluminum hydroxide powder was used as an additive besides the lithium carbonate, electrolytic manganese dioxide, and boric acid powders in Example 1 and these ingredients were mixed in such weighed amounts as to result in the composition $Li_{1.08}Al_{0.15}Mn_{1.78}B_{0.01}O_4$.

Example 7

A sample was obtained in completely the same manner as in Example 1, except that an aluminum hydroxide powder was used as an additive besides the lithium carbonate, electrolytic manganese dioxide, and boric acid powders in Example 1 and these ingredients were mixed in such weighed amounts as to result in the composition $Li_{1.01}Al_{0.33}Mn_{1.67}B_{0.01}O_4$.

Example 8

A sample was obtained in completely the same manner as in Example 1, except that an aluminum hydroxide powder was used as an additive besides the lithium carbonate, electrolytic manganese dioxide, and boric acid powders in Example 1 and these ingredients were mixed in such weighed amounts as to result in the composition $Li_{1.12}Al_{0.01}Mn_{1.88}B_{0.01}O_4$.

Example 9

A sample was obtained in completely the same manner as in Example 1, except that an aluminum hydroxide powder was used as an additive besides the lithium carbonate, electrolytic manganese dioxide, and boric acid powders in Example 1 and these ingredients were mixed in such weighed amounts as to result in the composition $Li_{1.2}Al_{0.1}Mn_{1.8}B_{0.01}O_4$.

Example 10

A sample was obtained in completely the same manner as in Example 1, except that an aluminum hydroxide powder was used as an additive besides the lithium carbonate, electrolytic manganese dioxide, and boric acid powders in Example 1 and these ingredients were mixed in such weighed amounts as to result in the composition $Li_{1.1}Al_{0.1}Mn_{1.8}B_{0.005}O_4$.

Example 11

A lithium carbonate powder (average particle diameter, 7 μm), a powder of electrolytic manganese dioxide (average particle diameter, 3 μm), and boric acid were used in such weighed amounts as to result in the composition $Li_{1.1}Mn_{1.9}B_{0.01}O_4$. These ingredients were transferred to a pot made of nylon and containing balls made of zirconia. After water was added thereto in an appropriate amount, the particulate ingredients were pulverized with a ball mill for 48 hours. Water was further added to the resultant slurry to regulate the solid concentration therein to 15 wt %. This slurry suffered no solid/liquid separation even through 2-hour standing, showing that it had a satisfactory dispersion state. The water was vaporized from the slurry with a spray dryer to obtain spherical dry particles. The spray drying was conducted at a hot-air inlet temperature of 250° C. and an outlet temperature of 140° C. The powder obtained was calcined at 850° C. for 10 hours to obtain a sample. This sample was dissolved in hydrochloric acid and this solution was examined with an ICP to conduct compositional analysis. The composition of the sample including boric acid compounds was $Li_{1.1}Mn_{1.9}B_{0.01}O_4$. The atomic ratio between the manganese in the lithium-manganese composite oxide and the boron in the boric acid compounds, B/Mn, was 0.0053.

Example 12

Completely the same procedure as in Example 11 was conducted, except that aluminum hydroxide was added to the lithium carbonate powder, electrolytic manganese dioxide powder, and boric acid powder in Example 11 and these ingredients were mixed in such weighed amounts as to result in the composition $Li_{1.1}Al_{0.1}Mn_{1.8}B_{0.01}O_4$. The composition of the sample obtained including boric acid compounds was $Li_{1.1}Mn_{1.8}Al_{0.1}B_{0.01}O_4$. The molar ratio between the manganese in the lithium-manganese composite oxide and the boron in the boric acid compounds (B/Mn) was 0.0056.

Example 13

Completely the same procedure as in Example 11 was conducted, except that chromium oxide $Cr_2O_3$ was added to the lithium carbonate powder, electrolytic manganese dioxide powder, and boric acid powder in Example 11 and these ingredients were mixed in such weighed amounts as to result in the composition $Li_{1.1}Cr_{0.1}Mn_{1.8}B_{0.01}O_4$. The composition of the sample obtained including boric acid compounds was $Li_{1.1}Mn_{1.8}Cr_{0.1}B_{0.01}O_4$. The molar ratio between the manganese in the lithium-manganese composite oxide and the boron in the boric acid compounds (B/Mn) was 0.0056.

Example 14

Completely the same procedure as in Example 11 was conducted, except that aluminum hydroxide and lithium fluoride were added to the lithium carbonate powder, electrolytic manganese dioxide powder, and boric acid powder in Example 11 and these ingredients were mixed in such weighed amounts as to result in the composition $Li_{1.1}Al_{0.1}Mn_{1.8}B_{0.01}O_{3.9}F_{0.1}$. The composition of the sample obtained including boric acid compounds was $Li_{1.1}Al_{0.1}Mn_{1.8}B_{0.01}O_{3.9}F_{0.1}$. The molar ratio between the manganese in the lithium-manganese composite oxide and the boron in the boric acid compounds (B/Mn) was 0.0056.

Example 15

The spinel lithium manganate powder obtained in Example 12 was suspended in water in a slurry concentration of 20 wt %. This suspension was stirred at 95° C. for 6 hr. Thereafter, the solid matter was recovered by filtration and dried to obtain a sample. The sample obtained was dissolved in hydrochloric acid and this solution was examined with an ICP to conduct compositional analysis. The composition of the sample including boric acid compounds was $Li_{1.1}Mn_{1.8}Al_{0.1}B_{0.0004}$. The molar ratio between the manganese in the lithium-manganese composite oxide and the boron in the boric acid compounds (B/Mn) was 0.00022.

Comparative Example 1

A sample was obtained in completely the same manner as in Example 1, except that the lithium carbonate powder was replaced with a lithium hydroxide monohydrate ($LiOH \cdot H_2O$) powder. Incidentally, the lithium hydroxide monohydrate in the slurry before spray drying was in the state of being completely dissolved in the water.

Comparative Examples 2 to 4

Samples were obtained in completely the same manners as in Examples 2 to 4, except that the lithium carbonate powder was replaced with a lithium hydroxide monohydrate ($LiOH \cdot H_2O$) powder. Incidentally, the lithium hydroxide monohydrate in the slurry before spray drying was in the state of being completely dissolved in the water.

Comparative Example 5

A sample was obtained in completely the same manner as in Example 5, except that the lithium carbonate powder was replaced with a lithium hydroxide monohydrate ($LiOH \cdot H_2O$) powder. Incidentally, the lithium hydroxide monohydrate in the slurry before spray drying was in the state of being completely dissolved in the water.

Comparative Example 6

A powder of electrolytic manganese dioxide (average particle diameter, 15 μm) and a powder of lithium carbonate (average particle diameter, 3 μm) were dry-blended with each other in such weighed amounts as to result in the composition $Li_{1.12}Mn_{1.88}O_4$. Thereafter, the mixture was calcined at 900° C. for 12 hours to obtain a sample in which the starting materials had been converted to a lithium-manganese composite oxide.

Example 16

The mixed particles of manganese dioxide and lithium carbonate contained in the slurry which was subjected to spray drying in Example 1 were examined for particle size with a laser diffraction/scattering particle size analyzer. As a result, the volume-average particle diameter thereof was 0.65 μm, and the standard deviation indicating the width of particle size distribution was 0.07.

Example 17

The samples of Examples 1 to 10, Comparative Examples 1 to 5, and Comparative Example 6 were examined for composition by chemical analysis, for specific surface area with a BET measuring apparatus, for the average diameter of the granular secondary particles with a laser diffraction/scattering particle size analyzer, and for the average diameter of the crystalline primary particles constituting the granules with a scanning electron microscope. The results shown in Table 1 were obtained.

TABLE 1

|  | Composition of granular secondary particles of composite oxide | Boron amount B/Mn | Specific surface area (m²/g) | Average diameter of granular secondary particles (μm) | Average diameter of crystalline primary particles (μm) |
|---|---|---|---|---|---|
| Example 1 | $Li_{1.08}Mn_{1.92}O_4$ | 0.0001 | 0.55 | 19.7 | 1.5 |
| Example 2 | $Li_{1.08}Al_{0.10}Mn_{1.82}O_4$ | 0.0002 | 0.44 | 18.5 | 1.8 |
| Example 3 | $Li_{1.07}Cr_{0.09}Mn_{1.84}O_4$ | 0.0001 | 0.56 | 19.5 | 1.2 |
| Example 4 | $Li_{1.07}Ni_{0.10}Mn_{1.83}O_4$ | 0.0001 | 0.50 | 21.0 | 1.2 |
| Example 5 | $Li_{1.02}Al_{0.15}Mn_{1.83}O_{3.8}F_{0.2}$ | 0.0002 | 0.38 | 17.5 | 2.0 |
| Example 6 | $Li_{1.07}Al_{0.15}Mn_{1.78}O_4$ | 0.0002 | 0.51 | 19.1 | 1.7 |
| Example 7 | $Li_{1.00}Al_{0.33}Mn_{1.67}O_4$ | 0.0001 | 0.52 | 17.9 | 1.6 |
| Example 8 | $Li_{1.11}Al_{0.01}Mn_{1.88}O_4$ | 0.0001 | 0.50 | 18.5 | 1.5 |
| Example 9 | $Li_{1.10}Al_{0.10}Mn_{1.80}O_4$ | 0.0002 | 0.48 | 16.8 | 1.6 |
| Example 10 | $Li_{1.09}Al_{0.10}Mn_{1.81}O_4$ | 0.0002 | 0.49 | 19.7 | 1.7 |
| Comparative Example 1 | $Li_{1.07}Mn_{1.93}O_4$ | 0.0001 | 0.48 | 18.5 | 1.4 |
| Comparative Example 2 | $Li_{1.08}Al_{0.09}Mn_{1.83}O_4$ | 0.0002 | 0.40 | 19.0 | 1.8 |
| Comparative Example 3 | $Li_{1.07}Cr_{0.10}Mn_{1.83}O_4$ | 0.0002 | 0.48 | 20.3 | 1.5 |
| Comparative | $Li_{1.07}Ni_{0.10}Mn_{1.83}O_4$ | 0.0001 | 0.42 | 18.0 | 1.0 |

TABLE 1-continued

| | Composition of granular secondary particles of composite oxide | Boron amount B/Mn | Specific surface area (m²/g) | Average diameter of granular secondary particles (μm) | Average diameter of crystalline primary particles (μm) |
|---|---|---|---|---|---|
| Example 4 Comparative Example 5 | $Li_{1.02}Al_{0.16}Mn_{1.82}O_{3.8}F_{0.2}$ | 0.0002 | 0.40 | 15.5 | 1.7 |
| Comparative Example 6 | $Li_{1.11}Mn_{1.89}O_4$ | 0.0001 | 0.40 | 13.8 | 1.6 |

Example 18

Figure 1:
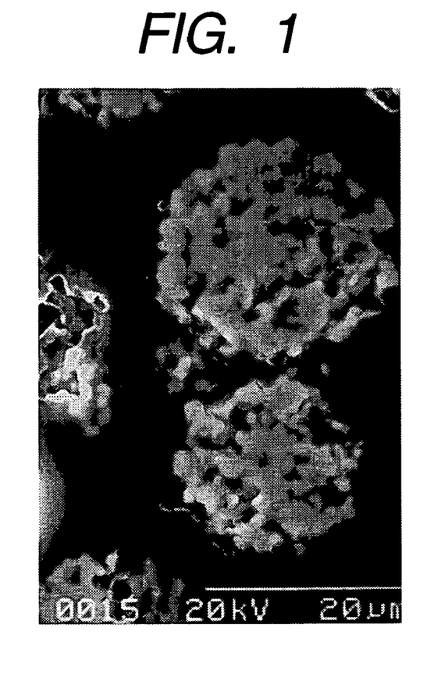
FIG. 1 is a photograph of a section of granular secondary particles as the sample in Example 2.
Figure 2:
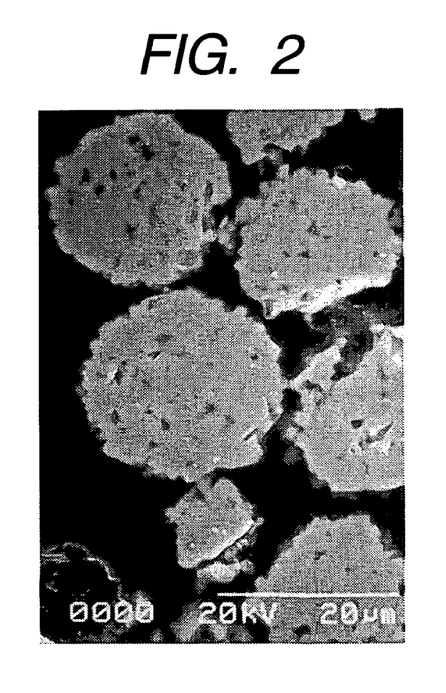
FIG. 2 is a photograph of a section of granular secondary particles as the sample in Comparative Example 2.
Figure 3:
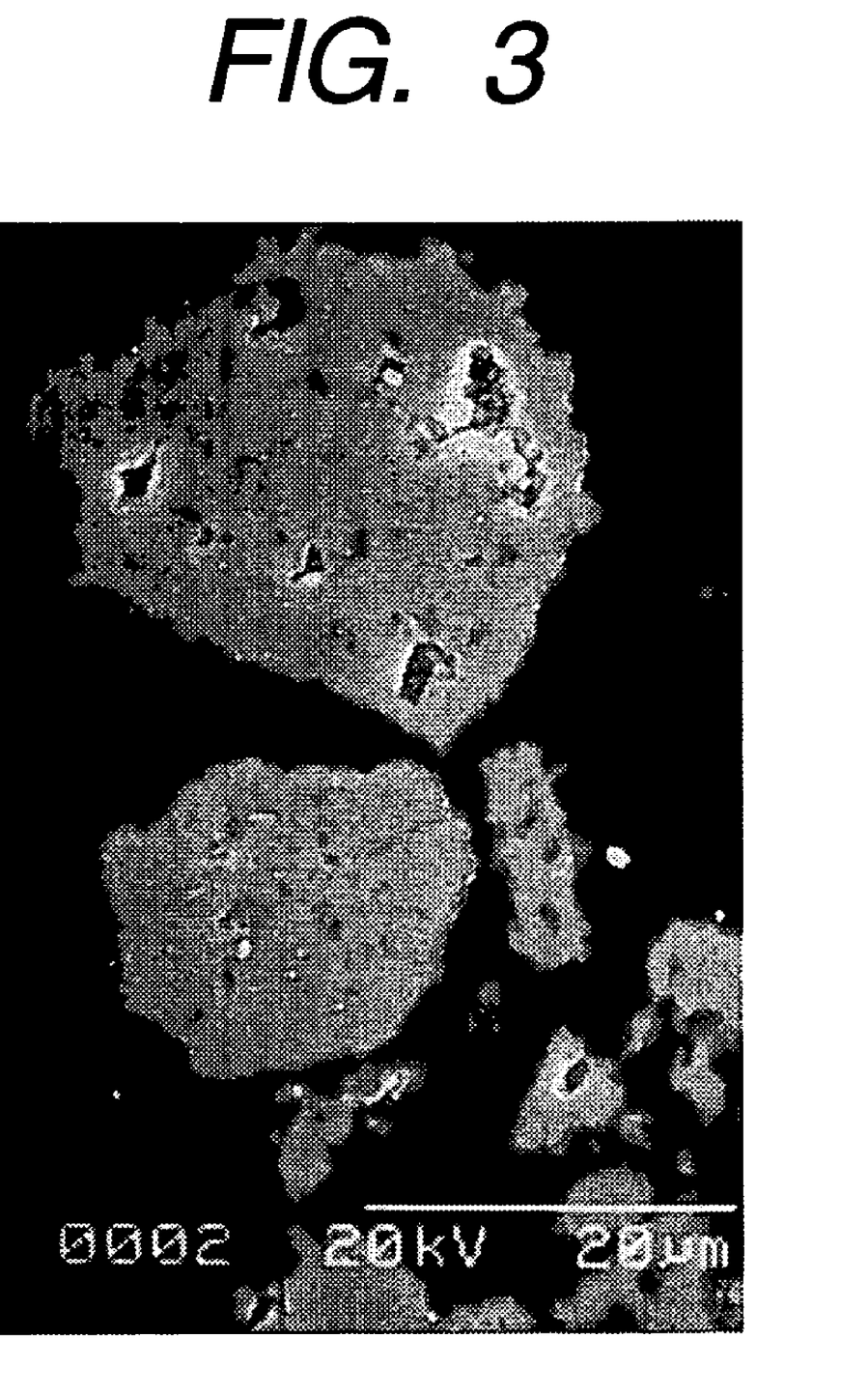
FIG. 3 is a photograph of a section of granular secondary particles as the sample in Comparative Example 6.

With respect to the samples of Examples 1 to 10, Comparative Examples 1 to 5, and Comparative Example 6, photographs of sections of granular secondary particles were taken with a scanning electron microscope. Samples for this photographing were prepared by embedding a powder in a curable resin and polishing a surface thereof to expose sections of granules. The electron photomicrographs were subjected to image analysis to determine the average diameter and amount of open voids present in the granular secondary particles. The results shown in Table 2 were obtained. Examples of the electron photomicrographs of granule sections (Example 2, Comparative Example 2, and Comparative Example 6) are shown in FIGS. 1 to 3. The values of average open-void diameter were number-average values for from 500 to 1,000 voids.

TABLE 2

| | Composition of granular secondary particles of composite oxide | Average open-void diameter (μm) | Amount of open voids (vol %) |
|---|---|---|---|
| Example 1 | $Li_{1.08}Mn_{1.92}O_4$ | 1.8 | 9.1 |
| Example 2 | $Li_{1.08}Al_{0.10}Mn_{1.82}O_4$ | 2.2 | 8.4 |
| Example 3 | $Li_{1.07}Cr_{0.09}Mn_{1.84}O_4$ | 2.8 | 12.2 |
| Example 4 | $Li_{1.07}Ni_{0.10}Mn_{1.83}O_4$ | 2.5 | 5.5 |
| Example 5 | $Li_{1.02}Al_{0.15}Mn_{1.83}O_{3.8}F_{0.2}$ | 1.5 | 15.5 |
| Example 6 | $Li_{1.07}Al_{0.15}Mn_{1.78}O_4$ | 2.4 | 8.2 |
| Example 7 | $Li_{1.00}Al_{0.33}Mn_{1.67}O_4$ | 2.1 | 8.3 |
| Example 8 | $Li_{1.11}Al_{0.01}Mn_{1.88}O_4$ | 2.3 | 8.5 |
| Example 9 | $Li_{1.10}Al_{0.10}Mn_{1.80}O_4$ | 2.2 | 8.5 |
| Example 10 | $Li_{1.09}Al_{0.10}Mn_{1.81}O_4$ | 2.0 | 8.1 |
| Comparative Example 1 | $Li_{1.07}Mn_{1.93}O_4$ | 1.1 | 2.0 |
| Comparative Example 2 | $Li_{1.08}Al_{0.09}Mn_{1.83}O_4$ | 0.9 | 2.5 |
| Comparative Example 3 | $Li_{1.07}Cr_{0.10}Mn_{1.83}O_4$ | 0.7 | 1.5 |
| Comparative Example 4 | $Li_{1.07}Ni_{0.10}Mn_{1.83}O_4$ | 1.5 | 2.0 |
| Comparative Example 5 | $Li_{1.02}Al_{0.16}Mn_{1.82}O_{3.8}F_{0.2}$ | 0.8 | 1.8 |
| Comparative Example 6 | $Li_{1.11}Mn_{1.89}O_4$ | 0.3 | 0.5 |

Example 19

The slurries obtained in Examples 11 to 14 were added in a small amount to methanol and dispersed therein with ultrasonic. The particle diameter distribution was determined by the laser diffraction/scattering method. The results concerning the volume-average particle diameter of the particles constituting each slurry are shown in Table 3. The standard deviation indicating the width of particle size distribution was about 0.5 for each slurry. Subsequently, with respect to the samples obtained in Examples 11 to 15, a 10-g portion was placed in a measuring cylinder and the volume thereof was measured before and after 50 vibrations to determine the bulk density of the powder. The average particle diameter was determined by the measuring method described above. The results are also shown in Table 3. Furthermore, the structures of the samples obtained in Examples 11 to 15 were examined with a scanning electron microscope. As a result, the crystalline primary particles in each sample had a size of from 1 to 5 μm and an average particle diameter of about 2 μm. The granular secondary particles had an average diameter of about 20 μm and were spherical.

TABLE 3

| | Volume-average particle diameter of particles constituting slurry (μm) | Bulk density of lithium manganate powder (g/cm³) | | Volume-average particle diameter of lithium manganate powder (μm) |
|---|---|---|---|---|
| | | Before vibrations | After vibrations | |
| Example 11 | 0.7 | 1.1 | 1.7 | 18 |
| Example 12 | 0.5 | 1.2 | 1.7 | 20 |
| Example 13 | 0.6 | 1.1 | 1.6 | 19 |
| Example 14 | 0.7 | 1.3 | 1.8 | 20 |
| Example 15 | — | 1.2 | 1.7 | 20 |

Example 20

The samples obtained in Examples 11 and 12 were mixed with a conductive material/binder (acetylene black/Teflon) to obtain positive-electrode materials. Using lithium metal as a negative-electrode material and using an ethylene carbonate/dimethyl carbonate solution of $LiPF_6$ as a liquid electrolyte, coin batteries were fabricated. A charge/discharge test was conducted at 60° C. and a current density of 0.4 mA/cm² in a voltage range of from 4.3 to 3.0 V. The retention in cycling was determined from a difference in discharge capacity between the 10th cycle and the 50th cycle. The results shown in Table 4 were obtained.

TABLE 4

| | Composition determined by analysis (Composition of lithium-manganese composite oxide including boric acid compound) | Initial discharge capacity (mAh/g) | Retention in cycling (%/cycle) |
|---|---|---|---|
| Example 11 | $Li_{1.1}Mn_{1.9}B_{0.01}O_4$ | 104 | 99.94 |
| Example 12 | $Li_{1.1}Al_{0.1}Mn_{1.8}B_{0.01}O_4$ | 95 | 99.97 |
| Example 13 | $Li_{1.1}Cr_{0.1}Mn_{1.8}B_{0.01}O_4$ | 96 | 99.96 |
| Example 14 | $Li_{1.1}Al_{0.1}Mn_{1.8}B_{0.01}O_{3.9}F_{0.1}$ | 100 | 99.97 |
| Example 15 | $Li_{1.1}Al_{0.1}Mn_{1.8}B_{0.0004}O_4$ | 96 | 99.98 |

Example 21

Figure 4:
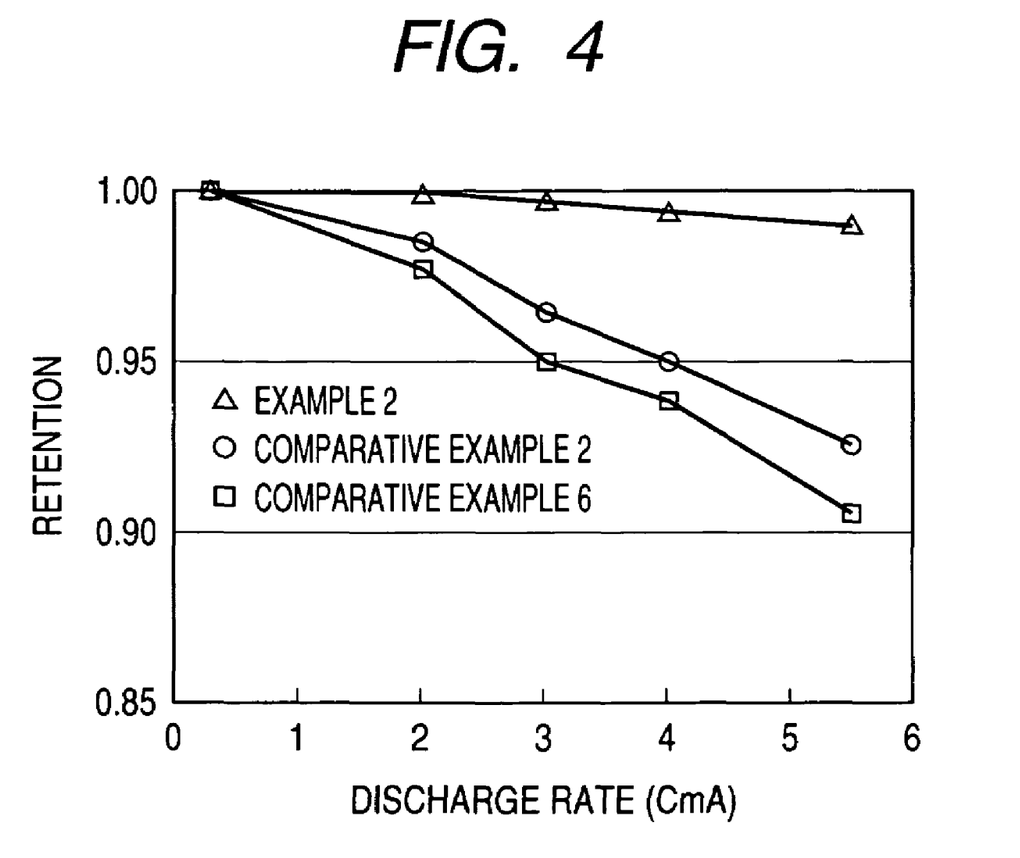
FIG. 4 is a graphic presentation showing the discharge rate characteristics of the samples in Example 2, Comparative Example 2, and Comparative Example 6.

With respect to the samples of Examples 1 to 10, Comparative Examples 1 to 5, and Comparative Example 6, discharge rate characteristics were examined. Each sample powder was mixed with a conductive material/binder (acetylene black/Teflon resin) to obtain a positive-electrode material. Using lithium metal as a negative-electrode material and using an ethylene carbonate/dimethyl carbonate solution of $LiPF_6$ as a liquid electrolyte, coin batteries were fabricated. These batteries were examined for discharge rate at room temperature. Examples of the results of the measurement are shown in FIG. 4. Furthermore, the rate retention (proportion of discharge capacity at 5.5 C. to discharge capacity at 0.3 C.) and discharge capacity for each sample are shown in Table 5. It is apparent that the samples of Examples 1 to 10 are superior in discharge rate characteristics to the samples of Comparative Examples 1 to 5 and Comparative Example 6.

TABLE 5

| | Composition of granular secondary particles of composite oxide | Rate retention (%) | Discharge capacity (mAh/g) |
|---|---|---|---|
| Example 1 | $Li_{1.08}Mn_{1.92}O_4$ | 99.0 | 110 |
| Example 2 | $Li_{1.08}Al_{0.10}Mn_{1.82}O_4$ | 99.3 | 102 |
| Example 3 | $Li_{1.07}Cr_{0.09}Mn_{1.84}O_4$ | 99.0 | 100 |
| Example 4 | $Li_{1.07}Ni_{0.10}Mn_{1.83}O_4$ | 99.1 | 95 |
| Example 5 | $Li_{1.02}Al_{0.15}Mn_{1.83}O_{3.8}F_{0.2}$ | 98.8 | 105 |
| Example 6 | $Li_{1.07}Al_{0.15}Mn_{1.78}O_4$ | 99.0 | 100 |
| Example 7 | $Li_{1.00}Al_{0.33}Mn_{1.67}O_4$ | 99.1 | 105 |
| Example 8 | $Li_{1.11}Al_{0.01}Mn_{1.88}O_4$ | 98.9 | 102 |
| Example 9 | $Li_{1.10}Al_{0.10}Mn_{1.80}O_4$ | 99.1 | 101 |
| Example 10 | $Li_{1.09}Al_{0.10}Mn_{1.81}O_4$ | 99.2 | 103 |
| Comparative Example 1 | $Li_{1.07}Mn_{1.93}O_4$ | 92.0 | 111 |
| Comparative Example 2 | $Li_{1.08}Al_{0.09}Mn_{1.83}O_4$ | 91.5 | 104 |
| Comparative Example 3 | $Li_{1.07}Cr_{0.10}Mn_{1.83}O_4$ | 91.0 | 100 |
| Comparative Example 4 | $Li_{1.07}Ni_{0.10}Mn_{1.83}O_4$ | 91.5 | 93 |
| Comparative Example 5 | $Li_{1.02}Al_{0.16}Mn_{1.82}O_{3.8}F_{0.2}$ | 92.0 | 104 |
| Comparative Example 6 | $Li_{1.11}Mn_{1.89}O_4$ | 92.5 | 103 |

INDUSTRIAL APPLICABILITY

The granular secondary particles of a lithium-manganese composite oxide of the invention show excellent discharge rate characteristics when used as the positive active material of a non-aqueous electrolyte secondary battery. The granular particles are hence useful especially as a positive active material for high-output lithium ion secondary batteries. Heightening the output of lithium ion secondary batteries is desired especially in application to hybrid electric cars, and the granular particles can be an effective material therefor. The granular particles can be utilized as a useful positive active material also in other applications of lithium ion secondary batteries, such as, e.g., power sources for purely electric cars, power storage, and portable appliances. The granular particles of the invention are highly worthy of industrial use.

The invention claimed is:

1. Granular secondary particles of a lithium-manganese composite oxide which are granular secondary particles made up of aggregated crystalline primary particles of a lithium-manganese composite oxide, characterized in that the granular secondary particles have many micrometer-size open voids therein, the open voids having an average diameter in the range of from 0.5 to 3 μm and the total volume of the open voids being in the range of from 3 to 20 vol. % on average based on the total volume of the granular secondary particles.

2. The granular secondary particles of a lithium-manganese composite oxide of claim 1, characterized in that the granular secondary particles have a specific surface area of from 0.2 to 1.0 $m^2/g$ and an average diameter of from 5 to 30 μm, and the crystalline primary particles constituting the granular secondary particles have an average diameter of from 0.5 to 4.0 μm.

3. The granular secondary particles of a lithium-manganese composite oxide of claim 1, which are represented by the compositional formula $Li_XM_YMn_{3-x-y}O_{4-Z}F_Z$ (wherein X, Y, and Z are such numbers that X=1.0 to 1.2, Y=0 to 0.3, and Z=0 to 0.3; and M represents one or more elements selected from Al, Co, Ni, Cr, Fe, and Mg).

4. The granular secondary particles of a lithium-manganese composite oxide of claim 1, characterized in that the content of one or more boric acid compounds contained as an impurity in the granular secondary particles of a lithium-manganese composite oxide is lower than 0.0005 in terms of molar ratio between the manganese and boron (B/Mn) contained in the lithium-manganese composite oxide.

5. The granular secondary particles of a lithium-manganese composite oxide of claim 4, characterized in that the boric acid compounds contained as an impurity are lithium borate and/or lithium sodium borate.

6. A process for producing the granular secondary particles of a lithium-manganese composite oxide of claim 1, characterized by the process comprising pulverizing a slurry comprising manganese oxide and lithium carbonate to produce a slurry comprising manganese oxide particles having an average particle diameter of 1 micrometer or smaller and lithium carbonate particles having an average particle diameter of 1 micrometer or smaller or pulverizing a slurry comprising manganese oxide, lithium carbonate and a compound containing one or more elements selected from Al, Co, Ni, Cr, Fe, and Mg to produce a slurry comprising manganese oxide particles having an average particle diameter of 1 micrometer or smaller, lithium carbonate particles having an average particle diameter of 1 micrometer or smaller, and a compound containing one or more elements selected from Al, Co, Ni, Cr, Fe, and Mg, spray drying the slurry to thereby granulate the slurry and then calcining the granules at a temperature of from 700 to 900° C.

7. The process for producing granular secondary particles of a lithium-manganese composite oxide of claim 6, characterized in that a compound which is a compound of an element other than manganese, lithium, fluorine, aluminum, cobalt, nickel, chromium, iron, and magnesium and is not an agent for open-void formation is added as an additive to the slurry.

8. The process for producing granular secondary particles of a lithium-manganese composite oxide of claim 7, characterized in that the additive is a boron compound, and that the compound is added to the slurry in an amount in the range of from 0.0005 to 0.05 in terms of molar ratio between manganese and boron (B/Mn) and, after the calcining, the boron is removed by water washing to such a degree that the molar ratio (B/Mn) decreases to below 0.0005.

9. A process for producing the granular secondary particles of a lithium-manganese composite oxide of claim 1, characterized by comprising spray-drying a slurry prepared by dispersing a fine powder of a manganese oxide, a lithium source, and an agent for open-void formation or by dispersing a fine powder of a manganese oxide, a fine powder of lithium carbonate, a compound containing one or more elements selected from Al, Co, Ni, Cr, Fe, and Mg, and an agent for open-void formation to thereby granulate the slurry and then calcining the granules at a temperature of from 700 to 900° C.

10. The process for producing granular secondary particles of a lithium-manganese composite oxide of claim 9, characterized in that the agent for open-void formation is a substance which has an average particle diameter of 1 µm or smaller and disappears upon heating.

11. A non-aqueous electrolyte secondary battery characterized by employing the granular secondary particles of a lithium-manganese composite oxide of claim 1 as a positive active material.

* * * * *